United States Patent
Bozio et al.

(10) Patent No.: US 8,627,586 B2
(45) Date of Patent: Jan. 14, 2014

(54) ILLUMINATED TRIM PANELS

(75) Inventors: Ronald A. Bozio, Holland, MI (US);
Scott A. Hansen, Holland, MI (US);
Gregg S. Evans, Windsor (CA); Chun Yi Yeo, Singapore (SG)

(73) Assignee: Johnson Controls Technology Corporation, Holland, MI (US)

( * ) Notice: Subject to any disclaimer, the term of this patent is extended or adjusted under 35 U.S.C. 154(b) by 0 days.

(21) Appl. No.: 12/625,673

(22) Filed: Nov. 25, 2009

(65) Prior Publication Data

US 2010/0154261 A1   Jun. 24, 2010

Related U.S. Application Data

(60) Provisional application No. 61/118,319, filed on Nov. 26, 2008.

(51) Int. Cl.
*G09F 13/06* (2006.01)
(52) U.S. Cl.
USPC .......................................................... 40/580
(58) Field of Classification Search
USPC .......................................................... 40/580
See application file for complete search history.

(56) References Cited

U.S. PATENT DOCUMENTS

| | | | |
|---|---|---|---|
| 4,398,723 A * | 8/1983 | Erickson et al. | 352/72 |
| 5,009,019 A * | 4/1991 | Erlendsson et al. | 40/541 |
| 5,444,932 A * | 8/1995 | Jeroma | 40/564 |
| 5,899,558 A * | 5/1999 | Suzuki et al. | 362/489 |
| 6,326,569 B1 * | 12/2001 | Ardrey et al. | 200/314 |
| 6,417,779 B1 | 7/2002 | Noll | |
| 7,047,679 B2 * | 5/2006 | Underwood et al. | 40/570 |
| 2005/0055857 A1 * | 3/2005 | Vazquez | 40/576 |
| 2005/0134485 A1 | 6/2005 | Hein | |
| 2007/0180842 A1 * | 8/2007 | LaRose | 62/246 |
| 2009/0213573 A1 * | 8/2009 | Furukawa et al. | 362/97.1 |

FOREIGN PATENT DOCUMENTS

| | | |
|---|---|---|
| EP | 1758070 | 2/2007 |
| EP | 1839945 | 10/2007 |

\* cited by examiner

*Primary Examiner* — Gary Hoge
(74) *Attorney, Agent, or Firm* — Michael Best & Friedrich LLP (57) ABSTRACT

A vehicle trim panel is illuminated from behind to create an illuminated design (e.g., logo and/or lettering) includes a transparent layer and an opaque layer with an opening(s) in the shape of the design. An opaque or partially opaque design piece may be placed over the opening(s) in the opaque layer and be lit around its edges. The vehicle trim panel may be formed by forming a panel with a transparent layer and an opaque layer. An opening in the opaque layer may be formed by removing opaque material (e.g., by machining or laser etching) or by masking (the mask is placed between the opaque layer and transparent layer and removed taking a portion of the opaque layer with it). A design piece may be placed over the location of the opening in the opaque layer.

15 Claims, 6 Drawing Sheets

ILLUMINATED TRIM PANELS

This application claims priority to U.S. Provisional Application No. 61/118,319 filed Nov. 26, 2008, the entire disclosure of which is incorporated herein by reference.

BACKGROUND

1. Field of the Invention

This invention relates to a panel with an illuminated design piece and methods for making the same.

2. Related Art

Vehicles are commonly provided with various types of decorative trim portions. Vehicles also typically have various logos or designs located on interior trim pieces. However, decorative trim and designs in the vehicle cabin are difficult to perceive in darker conditions. Attempts have been made to illuminate trim logos. This is typically done by either placing the logo within the field of a light source or by making the logo element luminescent. The first method is not feasible for logos in most common locations, while the latter method may adversely affect the occupants' vision.

SUMMARY

This invention relates to a vehicle trim panel comprising a transparent layer, an opaque layer, and an opening through the opaque layer. In various exemplary embodiments, the panel also includes a design piece over the opening in the opaque layer.

This invention also relates to a method for making a panel comprising forming a transparent layer, forming an opaque layer on a first side of the transparent layer, and removing a portion of the opaque layer.

This invention also relates to a method for making a panel comprising forming a transparent layer, placing a mask over a portion of a first side of the transparent layer, forming an opaque layer on the first side of the transparent layer, removing the mask from the transparent layer forming an opening in the opaque layer, and placing a design piece over the gap in the opaque layer.

These and other features and advantages of various embodiments of systems and methods according to this invention are described in, or are apparent from, the following detailed descriptions of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein.

DETAILED DESCRIPTION

This invention relates to a panel with an illuminated design (e.g., lettering and/or logo) and methods for manufacturing the same. In various exemplary embodiments, the panel includes a transparent substrate layer and an opaque layer with an opening in the shape of the desired design. In various exemplary embodiments, an at-least-partially-opaque design piece is placed on the transparent layer opposite from the opaque layer. The term "partially opaque" refers to something that, is opaque to some part, but not all, of the visible light spectrum. The design piece is placed over the transparent layer and/or the opaque layer and approximately aligned with the opening(s) in the opaque layer. The opening(s) in the opaque layer may be different in size or dimensions from the design on the front of the panel. In various embodiments, the design piece is similar in size to the corresponding opening(s) in the opaque layer, and may be slightly larger to slightly smaller than the corresponding opening(s) in the opaque layer. In various exemplary embodiments, the opaque layer covers portions of the transparent layer that are not covered by the design piece, with a small area of overlap. In various exemplary embodiments, the design piece may be fully or partially opaque to visible light or may be translucent or luminescent. In operation, one or more light sources are placed behind the panel and/or the design. The one or more light sources provide light to the back side of the panel. The light then passes through gaps in the opaque layer and the transparent layer (either layer may be the top layer), and illuminates the transparent layer. In various exemplary embodiments with a design piece, the area around the edges of the design piece is illuminated. If the design piece is partially opaque, the design piece will also be illuminated.

This invention also relates to methods of manufacturing a panel with an illuminated design (e.g., lettering and/or logo). In one embodiment, a panel with a transparent layer and an opaque layer is formed. Opaque material may be added to a transparent layer or vice versa. One or more openings in the opaque layer corresponding to the desired design are formed. This process may be performed on the opaque layer before or after it is associated with the transparent layer. In various exemplary embodiments, a design piece representing the desired design is placed on the panel in alignment with the opening(s) in the opaque layer. The opening(s) in the opaque layer may be different in size or dimensions from the design piece. In various exemplary embodiments, the design piece may be made of a variety of materials such as, for example, metals, woods, plastics, and/or films.

Figure 1:
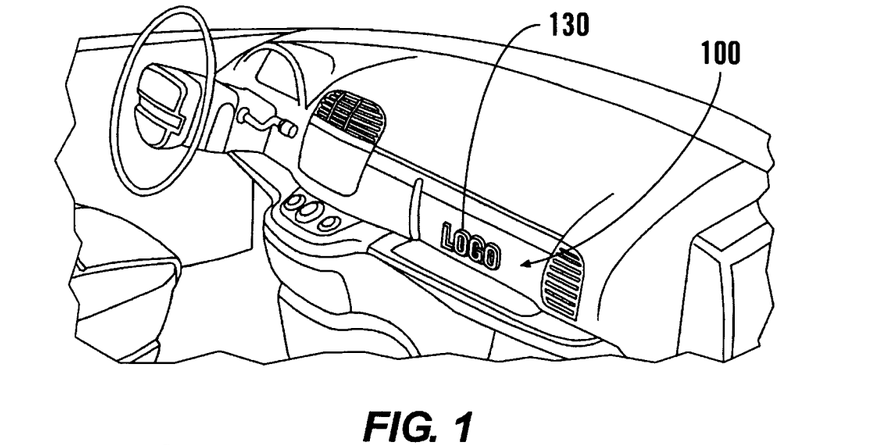
FIG. 1 is a partial perspective view of a vehicle interior including a first exemplary embodiment of a panel with a backlit badge according to this invention.

FIG. 1 shows a portion of a vehicle interior with an exemplary embodiment of a backlit logo and/or lettering 130 on a panel 100 on the dash. In various exemplary embodiments, the panel 100 may be any interior trim panel (e.g., dashboard or door panel) or trim piece (e.g., steering wheel). In various exemplary embodiments, the panel 100 may have lettering and/or a design element. In various exemplary embodiments, the backlit lettering and/or logo 130 on the panel 100 may be any size that the panel 100 is capable of accommodating.

Figure 2:
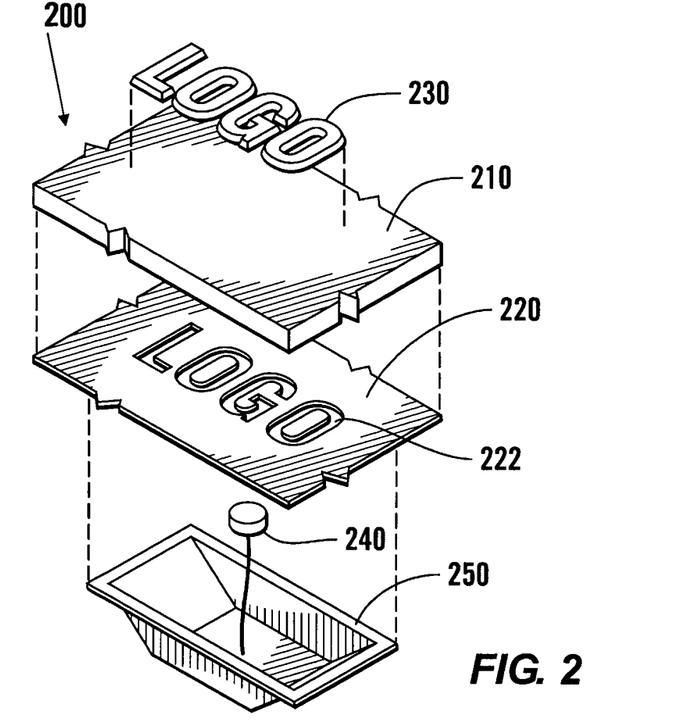
FIG. 2 is a partial exploded perspective view of a first exemplary embodiment of a panel according to this invention.

In various exemplary embodiments, as shown in FIG. 2, the panel 200 includes a transparent layer 210 with a design piece 230 on one side and an opaque layer 220 on the other side. In various exemplary embodiments, the design piece 230 is attached to the transparent layer 210 with an adhesive. The opaque layer 220 generally includes one or more regions 222 where the opaque material is omitted or removed. These omitted regions generally do not cover or block the transparent layer in areas opposite the design piece 230. However, in various exemplary embodiments, there may be some overlap between the design piece 230 and opaque layer 220. In use, one or more light sources 240 are placed on the side of the transparent layer 210 opposite the design piece 230 to provide light to the transparent layer 210. The transparent layer 210 will pass the provided light to the design piece based on the omitted regions 222 in the opaque layer 220. However, a light source 240 does not necessarily form part of this invention. The embodiment shown in FIG. 2 includes a light blocker or reflector 250 to increase the amount of light from the light source 240 that reaches the transparent layer 210.

Figure 3:
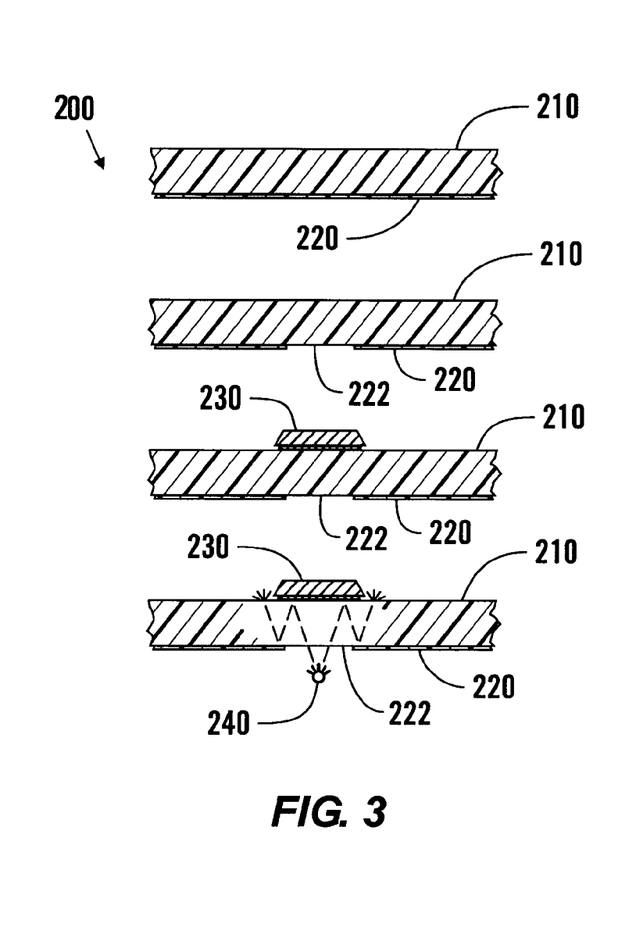
FIG. 3 illustrates a first exemplary method for producing the panel of FIG. 2 according to this invention.

As shown in FIG. 3, in various exemplary embodiments, the panel 200 may be manufactured by combining the layer 220 of an opaque material (e.g., paint, plastic, metal, and/or wood) and the transparent layer 210. In various exemplary embodiments, the opaque layer 220 may be applied by any known or later-developed method, such as, for example, spraying the opaque layer 220 onto the transparent layer 210. Alternatively, the transparent layer 210 may be applied to the opaque layer 220. Material from the opaque layer 220 may be removed at the appropriate omitted regions 222 by various methods such as, for example, laser etching, machining, or sandblasting. Removing material from the opaque layer 220 in the omitted regions 222 may result in removing some of the transparent material to insure complete removal of the opaque material without impairing the function of the panel 200. A design piece 230 is attached to the show surface of the transparent layer 210 by any appropriate method such as, for example, an adhesive. In various exemplary embodiments, the design piece 230 may be applied at any point in the process. FIG. 3 also shows a light source 240 and illustrates an exemplary path for light through the panel 200.

Figure 4:
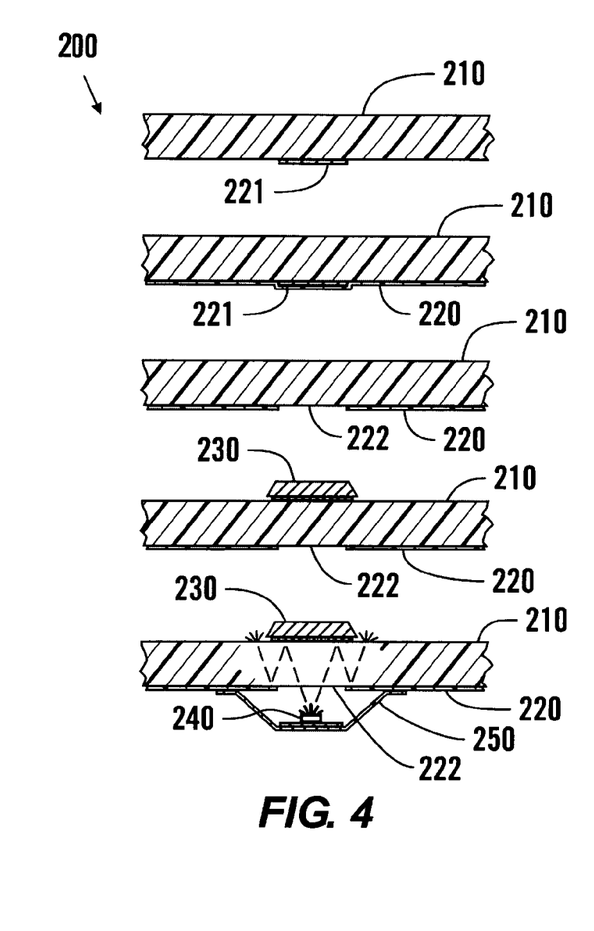
FIG. 4 illustrates a second exemplary method for producing the panel of FIG. 2 according to this invention.

As shown in FIG. 4, in various exemplary embodiments, a mask layer 221 is applied to the transparent layer 210 at locations where an opening (i.e., omitted region 222) in the opaque layer 220 is desired. The opaque layer 220 and the transparent layer 210 may be formed and/or combined by any known or later-developed method, such as, for example, by spraying the opaque layer 220 onto the transparent layer 210 or forming an opaque layer 220 and a transparent layer 210 and joining them. Alternatively, the transparent layer 210 may be applied to the opaque layer 220 and the mask layer 221. The mask layer 221 is then removed, taking the portion of the opaque layer 220, corresponding to the omitted regions with it. A design piece 230 is attached to the show surface of the transparent layer 210 by any appropriate method such as, for example, an adhesive. In various exemplary embodiments, the design piece 230 may be applied at any point in the process. FIG. 4 also shows a light source 240 and illustrates an exemplary path for light through the panel 200.

In FIGS. 3 and 4, the panel 200 is shown manufactured with the opaque layer 220 and/or mask layer 221 being applied to the transparent layer 210. In various other exemplary embodiments, the transparent layer 210 and/or mask layer 221 may be applied to an opaque layer 220. In various exemplary embodiments, the transparent layer 210 may be partially opaque (e.g., may be transparent to only one color of light).

In various exemplary embodiments, one or more light sources 240 are placed on the side of the transparent layer 210 opposite the design piece 230. The light source 240 may be any type of light source such as, for example, light emitting diode(s) ("LED") of one or more colors, fluorescent lights, and incandescent lights. The light source 240 may also include one or more light pipes carrying light from one or more remotely located light sources 240. The light source(s) 240 may produce light of any color or from any portion of the light spectrum. In various exemplary embodiments, a light filter may be placed between the light source 240 and the panel 200 or may be included on or in the panel 200.

In various exemplary embodiments, the transparent layer 210 comprises a clear polymer such as, for example, polycarbonate or acrylic. In various other exemplary embodiments, the transparent layer 210 may comprise a translucent material, such as, for example, polypropylene or acrylonitrile butadiene styrene (ABS). In other exemplary embodiments, the transparent layer 210 may be colored. In various exemplary embodiments, the transparent layer 210 is colored then heat attached to the panel. In various exemplary embodiments, the transparent layer 210 is approximately 2.5 to about 3.0 mm thick, but no particular thickness is required.

In various exemplary embodiments, the opaque layer 220 is a paint layer, such as, for example, a vinyl paint. In other exemplary embodiments, the opaque layer 220 may be made of any opaque material, such as, for example, decorative films, hot stamp foil, chrome, metallic coating (e.g., by vacuum metallization or other methods), or a secondary part (made of, e.g., metal, plastic, and/or wood) laid against the transparent layer 210. The opaque layer 220 may be of any color. However, darker colors absorb more light than lighter colors, which may make it desirable to use a brighter light source with darker colors than would be necessary with lighter colors to achieve the same illumination. In various exemplary embodiments, the opaque layer 220 is thick enough to be completely opaque, but no particular thickness is required.

In various exemplary embodiments, the design piece 230 may be formed by applying an opaque material to the transparent layer 210 such as, for example, inks, paints, and/or stamps. In various exemplary embodiments, the design piece 230 may be formed by any method of applying an opaque material to the transparent layer 210 such as, for example, printing by various methods, masking, and/or painting. The design piece 230 may be of any color and may be opaque, partially opaque, and/or translucent. For example, in various exemplary embodiments, the design piece 230 is formed by applying a silver layer (e.g., by painting) to a surface of the transparent layer 210. A portion of the silver layer may be removed (e.g., by laser etching) to uncover a portion of the transparent layer 210 of the panel 200. In various exemplary embodiments, the design piece 230 is recessed into the panel 200 such that the top of the design piece 230 is approximately even with the surface of the surrounding panel 200.

Figure 5:
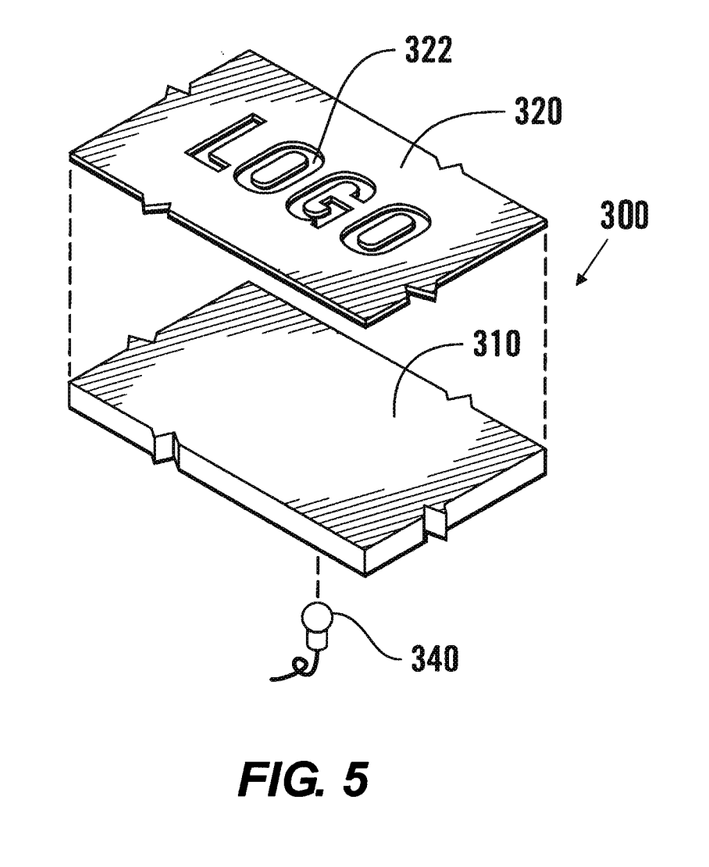
FIG. 5 is a partial exploded perspective view of a second exemplary embodiment of a panel according to this invention.
Figure 6:
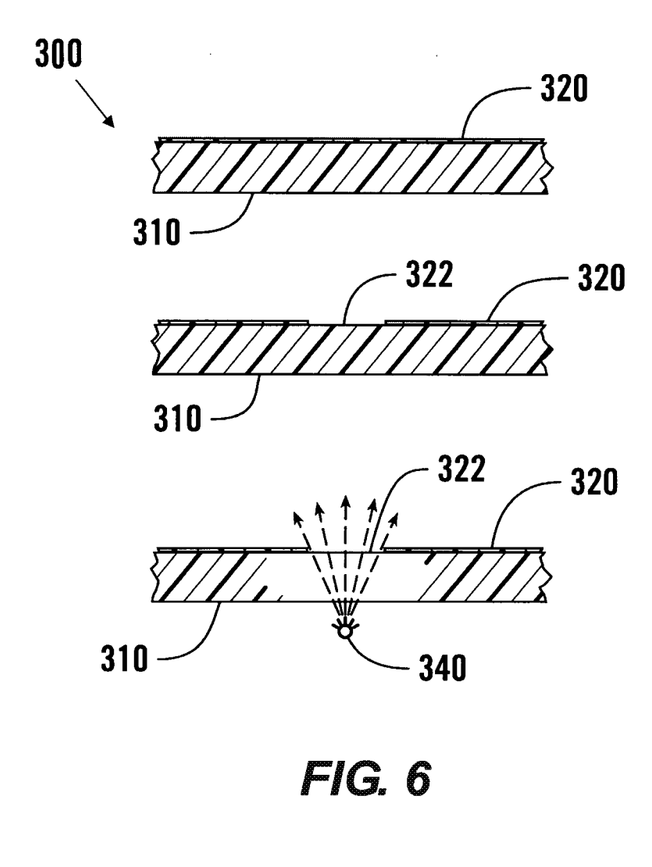
FIG. 6 illustrates a third exemplary method for producing the panel of FIG. 5 according to this invention.

In various exemplary embodiments, the design piece 330 can be omitted. As shown in FIGS. 5 and 6, in various exemplary embodiments, a panel 300 may be manufactured by combining a layer 320 of opaque material (e.g., paint) and a transparent layer 310. The opaque layer 320 may be applied by any known or later-developed method, such as, for example, spraying the opaque material onto the transparent layer 310. The opaque layer 320 may form or include the show surface of the panel 300. Portions of the opaque layer 320 may be removed at one or more appropriate regions 322 by various methods such as, for example, laser etching or machining, to form the design (e.g., logo and/or lettering). Removing portions of the opaque layer 320 may also result in removing some of the transparent material to insure complete removal of the opaque material without impairing the function of the panel 300. FIGS. 5 and 6 also show a light source 340. FIG. 6 illustrates an exemplary path for light through the panel 300. In various exemplary embodiments, the design piece 330 is recessed into the panel 300 such that the top of the design piece 330 is approximately even with the surface of the surrounding panel 300.

Figure 7:
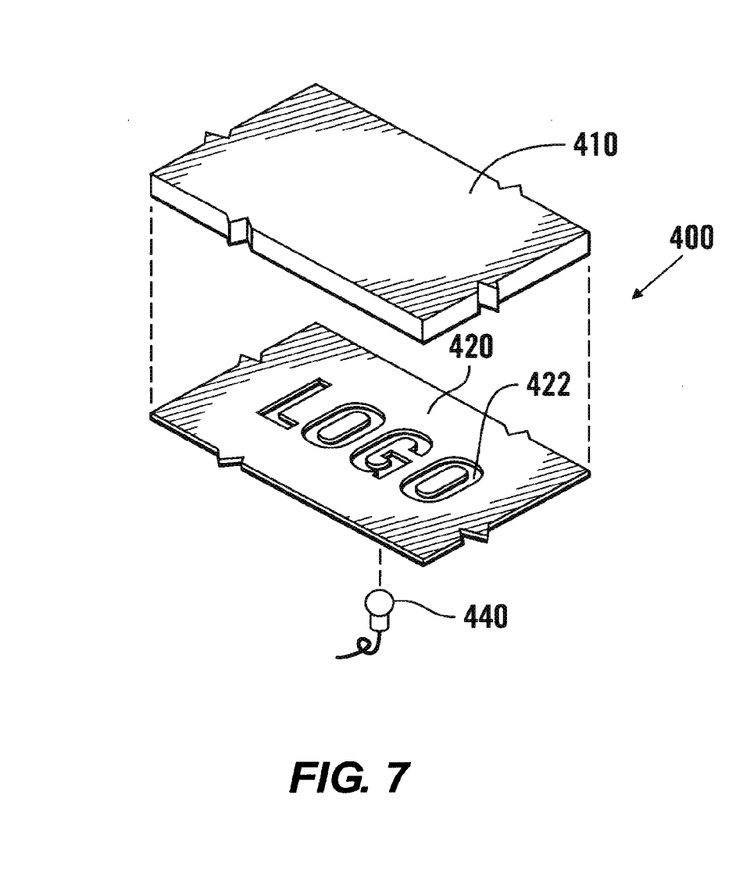
FIG. 7 is a partial exploded perspective view of a third exemplary embodiment of a panel according to this invention.
Figure 9:
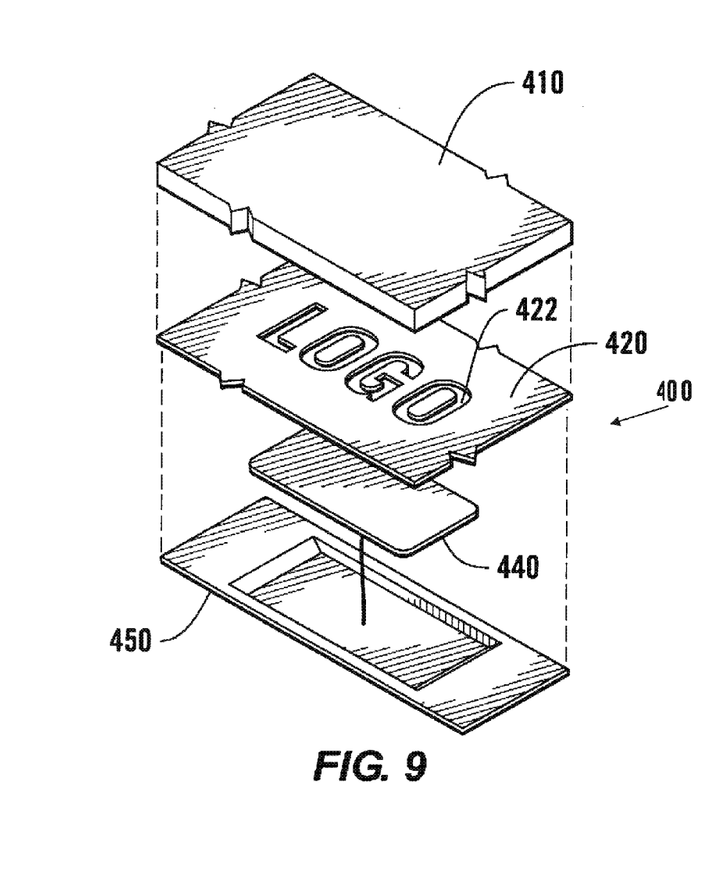
FIG. 9 is a partial cross-sectional view of a fourth exemplary embodiment of a panel according to this invention.

As shown in FIGS. 7 and 9, in various exemplary embodiments of the panel 400 where the design piece is omitted, the transparent layer 410 may be the outer surface of a panel 400. For example, the transparent layer 410 may be a thin protective layer (e.g., a plastic) placed over an opaque layer 420 that is visible to the vehicle occupant as the show layer. The opaque layer 420 may be made of any material appropriate for a given trim panel such as, for example, fabrics, plastics, metal, and/or wood.

Figure 8:
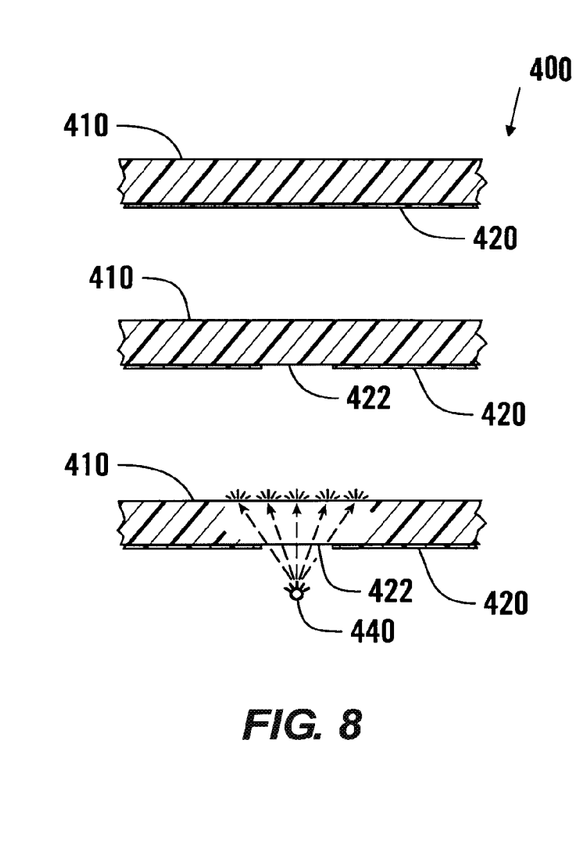
FIG. 8 illustrates a fourth exemplary embodiment for producing a panel according to this invention.

As shown in FIG. 8, in various exemplary embodiments, the panel 400 may be manufactured by combining a layer 420 of opaque material and a transparent layer 410. The opaque layer 420 may be made of any material appropriate for a given trim panel such as, for example, fabrics, plastics, metal, and/or wood. The opaque layer 420 and the transparent layer 410 may be formed and/or combined by any known or later-developed method, such as, for example, by spraying the opaque layer 420 onto the transparent layer 410 or forming an opaque layer 420 and a transparent layer 410 and joining them. Alternatively, the transparent layer 410 may be applied to the opaque layer 420. The opaque material 420 may be removed at the appropriate locations 422 by various methods such as, for example, laser etching or machining. Removing material from the opaque layer 420 may also result in removing some of the transparent layer 410 material to insure complete removal of the opaque material without impairing the function of the panel 400. A design piece 430 is attached to the show surface of the transparent layer 410 by any appropriate method such as, for example, an adhesive. In various exemplary embodiments, the design piece 430 may be applied at any point in the process. FIGS. 7-10 also shows a light source 440 and illustrates an exemplary path for light through the panel 400. The embodiment shown in FIGS. 9 and 10 includes a light blocker or reflector 450 to increase the amount of light from the light source 440 that reaches the transparent layer 410.

Figure 10:
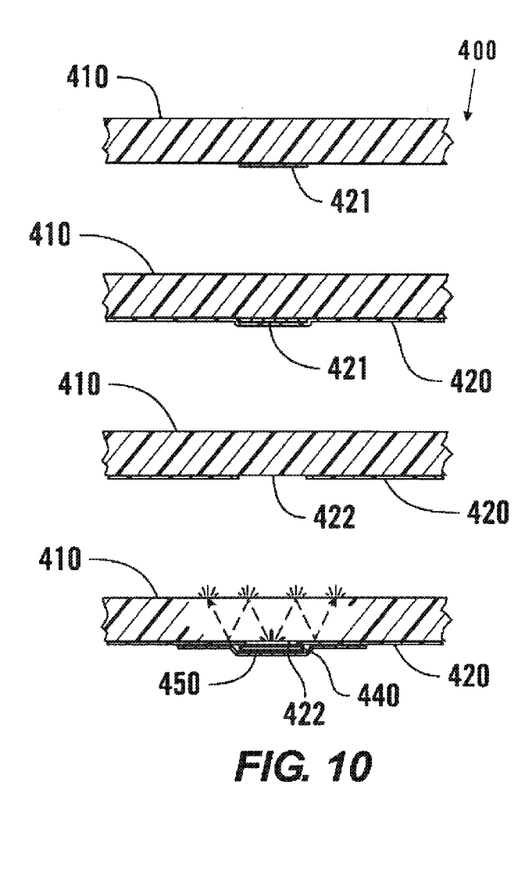
FIG. 10 illustrates a fifth exemplary embodiment for producing a panel according to this invention.

As shown in FIG. 10, in various exemplary embodiments, a mask layer 421 is applied to the transparent layer 410 at locations where an opening (i.e., omitted region 422) in the opaque layer 420 is desired. The opaque layer 420 may be applied to the transparent layer 410 by any known or later-developed method, such as, for example, by spraying the opaque layer 420 onto the transparent layer 410 and the mask layer 421 or forming an opaque layer 420 and combining it with the transparent layer 410. Alternatively, the transparent layer 410 may be applied to the opaque layer 420 with the mask layer 421 first placed on the opaque layer 420. The mask layer 421 is then removed, taking the portion of the opaque layer 420, corresponding to the omitted regions 422, with it. A design piece 430 is attached to the show surface of the transparent layer 410 by any appropriate method such as, for example, an adhesive. FIG. 10 also shows a light source 440 and illustrates an exemplary path for light through the panel 400. In various exemplary embodiments, the light source 440 may be located on either side of the panel 400 (i.e., either side of the panel may be the show side). In various exemplary embodiments, the design piece 430 is recessed into the panel 400 such that the top of the design piece 430 is approximately even with the surface of the surrounding panel 400.

Figure 11:
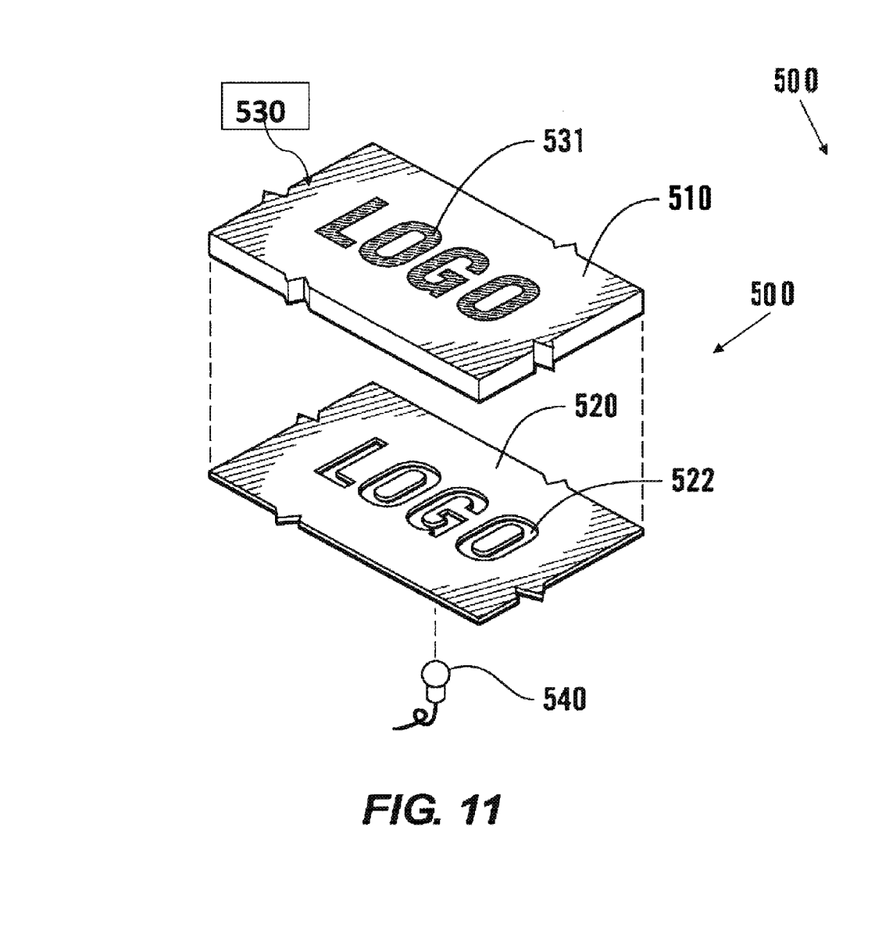
FIG. 11 is a partial cross-sectional view of a fourth exemplary embodiment of a panel according to this invention.
Figure 12:
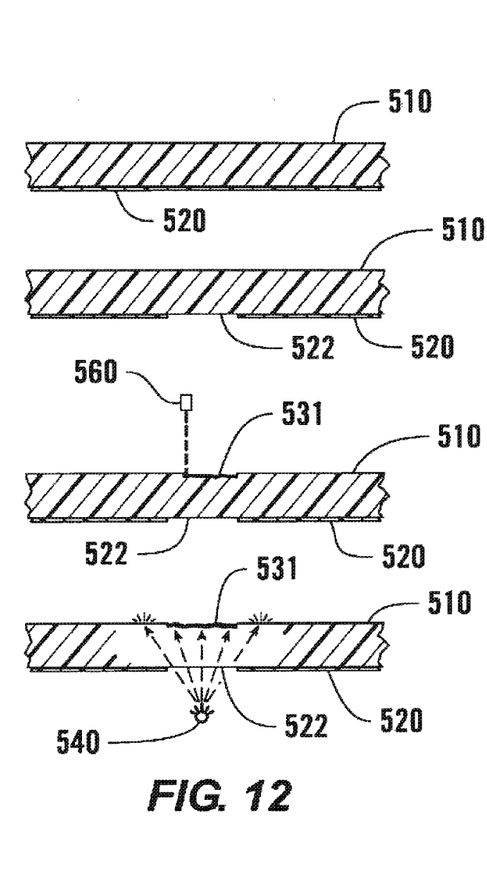
FIG. 12 illustrates a fifth exemplary embodiment for producing a panel according to this invention.

FIG. 11 shows a panel 500 with a design piece 530 that is integral to the transparent layer 510. The design piece 530 is formed by treating the transparent layer 510 with a laser creating an opaque region 531 (i.e., the design piece 530) in the transparent layer 510. As illustrated in FIG. 12, the opaque layer 520 is formed by applying a layer of opaque material and removing select portions 522, but may be formed by any of the methods described elsewhere in this disclosure. FIGS. 11 and 12 also shows a light source 540 and illustrates an exemplary path for light through the panel 500. The embodiment shown in FIGS. 11 and 12 includes a light blocker or reflector 550 to increase the amount of light from the light source 540 that reaches the transparent layer 510.

In various exemplary embodiments, the design piece is attached to the transparent layer with a white or light colored adhesive, which also helps scatter incoming light. In various other exemplary embodiments, the adhesive may be transparent or opaque and/or any color.

It should be appreciated that the trim panel may be adapted for use in both interior and exterior panels. For example, a logo or lettering is often located at the rear of a vehicle to identify the manufacturer and/or model of the vehicle. The disclosed methods and/or apparatus may be used to illuminate such logo or lettering.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

It should be appreciated that the construction and arrangement of the panel and design piece, as shown in the various exemplary embodiments, are illustrative only. While the panel and design piece, according to this invention, has been described in conjunction with the exemplary embodiments outlined above, various alternatives, modifications, variations, improvements, and/or substantial equivalents, whether known or that are or may be presently unforeseen, may become apparent. Accordingly, the exemplary embodiments of the console according to this invention, as set forth above, are intended to be illustrative, not limiting. Various changes may be made without departing from the spirit and scope of the invention. Therefore, the description provided above is intended to embrace all known or later-developed alternatives, modifications, variations, improvements, and/or substantial equivalents.

What is claimed is:

1. A vehicle trim panel comprising:
   a transparent layer;
   an opaque layer adjacent one side of the translucent layer;
   at least one opening provided in the opaque layer;

an opaque design piece adjacent the other side of the translucent layer and having a width greater than the opening, wherein the design piece is positioned to conceal the opening provided in the opaque layer from being directly viewed through the translucent layer; and a light source positioned to direct light through the opening into the translucent layer;

wherein the light is directed through the translucent layer and around the design piece.

2. The vehicle trim panel of claim 1 wherein the design piece comprises lettering.

3. The vehicle trim panel of claim 1 wherein the design piece comprises a logo.

4. The vehicle trim panel of claim 1 wherein the design piece comprises a layer of opaque material.

5. The vehicle trim panel of claim 1 wherein the design piece is attached to the transparent layer.

6. The vehicle trim panel of claim 1 wherein the translucent layer is transparent to only one color of light.

7. The vehicle trim panel of claim 1, wherein the translucent layer is a transparent layer.

8. The vehicle trim panel of claim 1, wherein the opaque layer is integral to the translucent layer.

9. The vehicle trim panel of claim 1, wherein light is inhibited from passing through any portion of the opaque design piece.

10. A method for making a panel comprising:

providing a transparent layer;

providing an opaque layer on a first side of the transparent layer;

forming an opening in the opaque layer;

positioning at least one opaque design element adjacent a second side of the translucent layer, the opaque design element having a width greater than the opening such that the opening in the opaque layer is concealed and is not otherwise directly visible from the second side of the translucent layer; and directing light through the translucent layer and around the design element.

11. The method of claim 10 wherein forming the opening includes removing at ;east a portion of the opaque layer layer comprises machining the opaque layer.

12. The method of claim 11 wherein removing a portion of the opaque layer comprises one of machining and laser etching the opaque layer.

13. The method of claim 10, further comprising positioning a light source to direct light through the opening into the translucent layer.

14. The method of claim 10 wherein the translucent layer is transparent to only one color of light.

15. The method of claim 10, further comprising inhibiting light from passing through any portion of the opaque design element.

* * * * *